United States Patent [19]
Engert et al.

[11] Patent Number: 5,520,729
[45] Date of Patent: May 28, 1996

[54] PROCESS FOR PRODUCING HEAT-INSULATING MATERIAL

[75] Inventors: Hanns-Jorg Engert; Thomas Koslowski, both of Aachen, Germany

[73] Assignee: SICOWA Verfahrenstechnik fur Baustoffe GmbH & Co. KG, Germany

[21] Appl. No.: 255,874

[22] Filed: Jun. 8, 1994

[30] Foreign Application Priority Data

Jun. 8, 1993 [DE] Germany ............ 43 18 874.5
Nov. 16, 1993 [DE] Germany ............ 43 39 137.0

[51] Int. Cl.$^6$ .................................... C04B 7/34
[52] U.S. Cl. .............. 106/601; 106/677; 106/680; 106/682; 106/692; 264/42; 264/86; 264/333; 252/62
[58] Field of Search ................ 252/62; 106/601, 106/605, 608, 611, 672, 677, 680, 682, 692, 696; 264/42, 234, 333, 86

[56] References Cited

U.S. PATENT DOCUMENTS

| | | | |
|---|---|---|---|
| 1,687,285 | 10/1928 | Emerson .................. | 106/680 |
| 3,231,657 | 1/1966 | Kalousek ................. | 264/333 |
| 3,505,439 | 4/1970 | Moorehead et al. ...... | 264/333 |
| 3,923,674 | 12/1975 | Shannon .................. | 106/601 |
| 3,926,650 | 12/1975 | Lange et al. ............. | 106/678 |
| 4,171,985 | 10/1979 | Motoki et al. ........... | 106/601 |
| 4,193,958 | 3/1980 | Uchida et al. ........... | 264/86 |
| 4,298,561 | 11/1981 | Uchida et al. ........... | 264/86 |
| 4,376,086 | 3/1983 | Schubert et al. ......... | 264/42 |
| 4,388,257 | 6/1983 | Oguri et al. ............. | 264/234 |
| 4,427,611 | 1/1984 | Oguri et al. ............. | 264/333 |
| 4,477,397 | 10/1984 | Helser ..................... | 264/333 |
| 4,490,320 | 12/1984 | Oguri et al. ............. | 264/333 |
| 4,613,472 | 9/1986 | Svanholm ................. | 264/42 |
| 4,655,979 | 4/1987 | Nakano et al. .......... | 106/677 |
| 4,670,055 | 6/1987 | Koslowski ............... | 106/677 |
| 4,683,003 | 7/1987 | Nakano et al. .......... | 106/677 |
| 4,873,141 | 10/1989 | Popovic ................... | 428/357 |
| 5,340,513 | 8/1994 | Koslowski et al. ...... | 106/805 |

FOREIGN PATENT DOCUMENTS

| | | | |
|---|---|---|---|
| 0038552 | 4/1981 | European Pat. Off. . | |
| 0151452 | 1/1985 | European Pat. Off. . | |
| 0263436 | 10/1987 | European Pat. Off. . | |
| 0628523 | 5/1994 | European Pat. Off. . | |
| 1601953 | 10/1970 | France . | |
| 287075 | 9/1915 | Germany . | |
| 626576 | 2/1936 | Germany . | |
| 2221678 | 12/1973 | Germany . | |
| 2751660 | 5/1978 | Germany . | |
| 0057941 | 4/1984 | Japan ...................... | 264/234 |
| 0916308 | 4/1982 | U.S.S.R. ................. | 264/234 |
| 889763 | 2/1962 | United Kingdom . | |
| 2166428 | 5/1986 | United Kingdom . | |

OTHER PUBLICATIONS

Chemical Abstracts, vol. 111, No. 2, 10. (Jul. 1989), Columbus Ohio, U.S. abstract No. 11773r, S. Mitsuta et al. "Manufacture of lightweight panel" p. 286.

*Primary Examiner*—Paul Marcantoni
*Attorney, Agent, or Firm*—Cushman Darby & Cushman

[57] ABSTRACT

The invention relates to a process for producing heat-insulating material from silicate-containing material, hydrated lime, water, foam and a reactive aluminates-containing quick-setting cement, from which a pourable raw mixture is produced which is poured into molds, the green moldings formed in the molds being demolded and autoclaved after sufficient setting. To achieve very low bulk densities, it is provided that, as silicate-containing material, a quartz powder with a specific surface area according to BET of at least approx. 3 m$^2$/g, in particular approx. 4 to 5 m$^2$/g, is used, the raw mixture is produced with a weight ratio of water/solids (excluding foam) of at least approx. 1.25 and an essentially stoichiometric amount, with respect to the virtually complete reaction of the quartz powder and the reactive aluminates, of hydrated lime with a surface area according to BET of at least approx. 15 m$^2$/g and the green moldings poured into molds are, after sufficient setting, demolded with the exception of a mold base and are autoclaved disposed on the mold base.

25 Claims, No Drawings

PROCESS FOR PRODUCING HEAT-INSULATING MATERIAL

The invention relates to a process for producing heat-insulating material according to the precharacterizing clause of claim 1.

EP-B-0,038,552 discloses a process for producing block-shaped wall construction materials based on lime silicate, in which a pourable raw mixture comprising essentially a granular silicate-containing material such as quartz sand, lime or hydrated lime, water, quick-setting cement and foam is produced and poured into moulds. The quick-setting cement is in this process formulated such that the raw mixture has a sufficient storage life during which virtually no strength-forming reactions take place. The latter are initiated essentially only by the effect of heat which takes place in the mould so that, on formwork stripping, the green moulding has sufficient strength for formwork stripping and transportation. The green moulding is subsequently autoclave-hardened. This process is suitable principally for producing bricks or blocks with relatively low bulk density of the order of magnitude of approx. 300 to 500 kg/m$^3$, however, lower bulk densities such as for materials which are used virtually only for heat insulation without them having to fulfil load-bearing functions are not attainable because, at very low bulk densities, segregation problems occur in the raw mixture which cannot be controlled without additional measures.

Porous concrete technology, in which gas bubbles are formed in a raw mixture by the reaction of aluminium added in powder form with the hydrated lime resulting from CaO in the raw mixture, to produce a pore structure in the raw mixture, is also not suitable for the production of materials with bulk densities of less than 300 kg/m$^3$, since in this case the gas pressure in the pores as a result of the heat produced on hydrating CaO would be so high that it would tear apart the raw material.

EP-B-0,211,365 discloses a quick-setting cement which contains 6 to 75 parts by weight of reactive calcium silicates, 9 to 60% by weight of reactive aluminates, calculated as Ca, 0.5 to 14 parts by weight of calcium sulphate hemihydrate and/or anhydrous calcium sulphate-III, 2 to 46 parts by weight of anhydrous calcium sulphate-II, 3 to 20 parts by weight of calcium hydroxide and 0.2 to 3.5 parts by weight of an organic setting retarder (for example citric acid monohydrate) retarding nucleation and the growth of calcium aluminate sulphate hydrate, the reaction chain taking place via the following reaction products: primary ettringite, mono-phases (calcium aluminate monosulphate), secondary ettringite and calcium hydrosilicate. In this process, a delay of the setting commencement of the reactive calcium silicates and aluminates is achieved which allows a sufficient workability time and, after the delay, an accelerated setting of the reactive calcium silicates and aluminates (first via monophase formation, then via secondary ettringite formation) is obtained. A quick-setting cement of this kind can be used in the production of silicate-bound wall construction materials.

The object of the invention is to provide a process according to the precharacterizing clause of claim 1, which allows a heat-insulating material with a very low bulk density, in particular below approx. 250 kg/m$^3$, or even less than 180 kg/m$^3$, to be produced.

This object is achieved according to the characterizing clause of claim 1.

In this process a quartz powder with a specific surface area according to BET of at least approx. 3 m$^2$/g, in particular approx. 4 to 5 m$^2$/g, (according to Blaine at least approx. 10,000 cm$^2$/g, in particular 12,000 to 14,000 cm$^2$/g) is used, said quartz powder having in particular a maximum grain size of approx. 20 μm, preferably approx. 10 μm, and possessing in particular an average grain size of approx. 2 to 3 μm.

Hydrated lime is used in an amount which is essentially stoichiometric to the amount required for the complete reaction of the quartz powder to form tobermorite ($C_5S_6H_5$) and of the reactive aluminates contained in the quick-setting cement to form monophases and (secondary) ettringite. The weight ratio of hydrated lime to quartz powder is in particular approx. between 1.1 and 1.4. In this case, hydrated lime with a specific surface area according to BET of at least approx. 15 m$^2$/g is used. For example, a hydrated lime with a specific surface area according to BET of approx. 17 to 20 m$^2$/g and an average grain size of approx. 4 to 5 μm is expedient. However, significantly finer hydrated lime, for example with a BET surface area of greater than 35 m$^2$/g, preferably together with quartz powder that is also very fine, can also be used.

When a quick-setting cement based on aluminous cement (for example together with anhydrite-II, plaster of Paris and citric acid) is used, a weight ratio of hydrated lime to quartz powder of approx. 1.2 is preferably used. By this means, a virtually complete reaction of quartz and hydrated lime to form tobermorite during steam hardening in the autoclave is achieved.

Because of its high amount proportion and its high specific surface area, the hydrated lime provides, in the raw mixture, a considerable proportion of at least approx. $10^{10}$ cm$^2$ per m$^3$ of raw material of the entire surface area of the solids used in the raw mixture. The entire surface area of the solids of the raw mixture is therefore generally greater than approx. $>1\times10^8$ cm$^2$ per (kg·m$^3$) of raw material.

First of all, from a quartz powder of this kind, hydrated lime and water, a water/solids suspension with a weight ratio of water to solids of at least approx. 1.25 in dependence on the water requirement of the feed substances, which increases with the fineness of the latter, up to approx. 1.85 is produced. Said suspension is made porous by means of prefabricated foam. The addition and intermixing of a separately mixed quick-setting cement suspension (for example corresponding to EP-B-0,211,365) are expediently carried out after the intermixing of the foam. The amount of quick-setting cement used is preferably approx. 15 to 25% by mass of the entire solids proportion.

The raw mixture thus produced, despite the very low solids proportion surprisingly, forms a homogeneous stable suspension over a time which is necessary for setting by means of the quick setting cement. The raw mixture can therefore be poured into moulds and the green mouldings poured into the moulds can, after sufficient setting (when the monophase formation of the quick-setting cement is essentially concluded, this may be the case, for example, after approx. 30 min), be demoulded with the exception of the mould base. The green mouldings are then expediently pre-stored, for example for approx. 6 h, and then, still disposed on the mould base, are introduced into an autoclave and are there steam-hardened, since they are too fragile for handling without remaining on the mould base. Subsequently, the steam-hardened blocks, insofar as they do not yet have the desired format, can be cut appropriately, for example into slab form. Finally the autoclaved material is dried.

The raw mixture consists essentially of a foam matrix of a spherical foam, the web thickness in the narrowest region of the webs between the foam bubbles being a few μm, that is to say being of the order of magnitude of or smaller than the average grain size of the quartz powder. The interstices between the foam bubbles are in this case filled with a low-solids water/solids suspension. This is possible because of the required grain fineness. The flowing-away of this suspension is made more difficult by the extremely small web thickness between the foam bubbles. Minimum web thickness between the pores of the skeleton is predominately approximately in the range between 2 and 5 microns. The foam proportion of the raw mixture is in this case essentially responsible for its stability.

As foam, a surfactant foam or protein foam or a mixture thereof may generally be used, a protein foam having a cellular pore structure being preferred. A foam bulk density in the range from approx. 60 to 80 kg/m³ may be used. An average pore diameter of the foam in the range from approx. 50 to 300 μm is expedient. By means of a foam gun, a very fine-pored, stiff and, at ambient temperature, relatively durable foam can be produced, which, in the case of a protein foam, is polyhedral, whereas the web thicknesses between the foam bubbles are minimal. The polyhedral foam structure of the protein foam changes, on intermixing the foam into the water/solids suspension, into a spherical structure, which has a favourable effect on the stability of the raw mixture.

In comparison to the use of foams from surfactants, the use of a protein foam leads to increased final strengths of the products produced.

The ratio of water to solids (ideally 1.39) and water to foam is expediently chosen such that the required high foam amount can be easily and gently intermixed and the raw mixture is only just flowable and self-levelling. Ratios that are too high may lead to a sedimentation of the solids, lower green moulding strength and lower autoclaving resistance, whereas ratios that are too low impair the flowability and the intermixing of the foam.

Instead of intermixing prefabricated foam, the foam former may also be added to the raw mixture and the raw mixture may then be foamed by appropriate stirring.

It is advantageous to add a stabilizer, such as pyrogenic silicic acid or polyvinyl pyrrolidone in particular in an amount of up to approx. 0.2% by weight of the raw mixture. By this means, the amount of quick-setting cement can be reduced.

In the raw mixture, the solids particles apparently fill the interspaces between the foam bubbles such that, despite the very low solids content of the order of magnitude of approx. 5% by volume, a pseudoplastic behaviour—possibly as a result of a non-Newtonian flow behaviour—results.

During autoclaving, it is expedient first of all to evacuate the autoclave, for example down to 0.4 bar. By this means the temperature gradient in the green moulding is lowered during subsequent heating and the heating is accelerated. It is also expedient to control the heating phase for the green mouldings disposed in the autoclave such that the shallowest possible temperature gradient from the outside of the green mouldings to the interior results, by carrying out, in particular the heating phase, with the use of an at least two-stage heating ramp.

In the heat-insulating material produced, a total porosity of generally >90% by volume up to approx. 96% by volume is achieved depending on the target bulk density of the heat-insulating material.

For the production of heat-insulating slabs, the following components, for example, may be used for the production of two different raw mixtures for a target bulk density of 130 kg/m³ and 150 kg/m³, respectively:

| | | |
|---|---|---|
| Water (20° C.) | 170 kg | 193.21 kg |
| | (17% by volume) | (19.3% by volume) |
| Protein foam | 55.75 kg | 53.67 kg |
| | (78.1% by volume) | (75.1% by volume) |
| (Foaming agent SB 3 from Heidelberger Zement, Addimentwerk, Leimen (Germany), foam bulk density 70 kg/m³, average pore size approx. 300 μm) | | |
| Stabilizer * (poly-vinyl pyrrolidone) | 0.232 kg | 0.232 kg |
| Quartz powder | 45.5 kg | 52.44 kg |
| | (1.72% by volume) | (1.98% by volume) |
| (specific surface area according to BET approx. 4 m²/g, average grain size 3 μm, maximum grain size 10 μm) | | |
| Hydrated lime | 54.61 kg | 63.06 kg |
| | (2.44% by volume) | (2.82% by volume) |
| (specific surface area according to BET approx. 18 m²/g, average grain size 5 μm) | | |
| Quick-setting cement | 23.57 kg | 23.57 kg |
| | (0.782% by volume) | (0.782% by volume) |
| In these mixtures the quick-setting cement has the following composition: | | |
| Aluminous cement | | 14.86 kg |
| Anhydrous calcium sulphate-II | | 8.0 kg |
| Calcium sulphate hemihydrate (plaster of Paris) | | 0.48 kg |
| Citric acid monohydrate | | 0.23 kg |

This results in a volume ratio of water to solids of 3.44 and 3.46, respectively. The total surface area of the substances per m³ of raw material is in this case approx. $1.3 \times 10^{10}$ cm² and approx. $1.5 \times 10^{10}$ cm², respectively, approx. $1 \times 10^{10}$ cm² and $1.2 \times 10^{10}$ cm², respectively being provided by the hydrated lime.

Approx. 30 min after the raw mixture is filled into moulds with a size of 1 m×1 m×40 cm, the formwork is stripped from the green mouldings, however the latter remain on the mould base. After a pre-storage time of approx. 6 h, they are transferred to an autoclave which is first of all evacuated to 0.4 bar. Then a slow heating (corresponding to the saturated steam curve) takes place for 2 h up to 3 bar, a more intense heating for 1.5 h up to 12 bar, subsequently for 0.5 h at 13.9 bar, which is followed by a holding phase of 8 h at approx. 14 bar (corresponding to approx. 198° C.) and then a heating-down phase of 2 h. After their removal from the autoclave, the autoclaved blocks are finally cut to form slabs with dimensions of 1 m×1 m×5 cm and dried to a moisture content of 10% by mass.

We claim:

1. A process for producing a light weight heat-insulating material of low bulk density comprising the steps:

(i) preparing a porous mixture consisting essentially of a quartz powder having a specific surface area according to BET of at least about 3 m²/g, an approximately stoichiometric amount of a hydrated lime necessary for forming tobermorite, said hydrated lime having a specific surface area according to BET of at least about 15 m²/g, water, foam and a reactive aluminates-containing quick-setting cement, wherein the weight ratio of water to solids, said solids not including the foam component, is from about 1.25 to about 1.85;

(ii) pouring the mixture into a mould, such that a green moulding is formed;

(iii) removing all portions of the mould except for the mould base once the green moulding has set; and (iv) autoclaving the green moulding on the mould base to obtain a light weight heat insulating material having a total porosity of approximately greater than 90% by volume and a bulk density of less than about 250 kg/m$^3$.

2. The process according to claim 1, wherein said quartz powder has a specific surface area according to BET in the range of from about 4 m$^2$/g to about 5 m$^2$/g.

3. The process according to claim 1, wherein said quartz powder has a maximum grain size of about 20 μm.

4. The process according to claim 1, wherein said quartz powder has a maximum grain size of about 10 μm.

5. The process according to claim 1, wherein said quartz powder has an average grain of from about 2 to about 3 μm.

6. The process according to claim 1, wherein said quick-setting cement is present in an amount of from about 15 to about 25% by weight of said solids.

7. The process according to claim 1, wherein the ratio of said hydrated lime to said quartz powder is from about 1.1 to about 1.4.

8. The process according to claim 1, wherein the ratio of said hydrated lime to said quartz powder is about 1.2.

9. The process according to claim 1, wherein said foam is a surfactant foam.

10. The process according to claim 1, wherein said foam is a protein foam.

11. The process according to either claim 9 or 10, wherein the bulk density of said foam is in the range of from about 60 to about 80 kg/m$^3$.

12. The process according to either claim 9 or 10, wherein the average pore diameter of said foam is in the range of from about 50 to about 300 μm.

13. The process according to claim 1, wherein said mixture includes a stabilizer.

14. The process according to claim 13, wherein said stabilizer is present in an amount up to about 0.2% by weight of said mixture.

15. The process according to claim 1, wherein said autoclaving step further includes heating said green moulding.

16. The process according to claim 1 wherein following autoclaving the heat insulating material a plurality of pores are formed with a minimum web thickness between pores approximately in the range of from about 2 to about 5 μm.

17. The process according to claim 15, wherein air is evacuated from said autoclave prior to said heating.

18. The process according to claim 15, wherein said heating includes at least two stages, such that each stage constitutes a distinct temperature gradient.

19. The process according to claim 15, wherein said heating of said green moulding in said autoclave is adjusted so that the smallest possible temperature gradient between the inner and outer portions of said green moulding is produced.

20. The process according to claim 15, wherein said heating comprises the steps:

(i) evacuating said autoclave of air to a pressure of about 0.4 bars prior to heating;

(ii) heating said green moulding for about 2 hours at a pressure of about 3 bars;

(iii) heating said green moulding for about 1.5 hours at a pressure of about 12 bars;

(iv) heating said green moulding for about 0.5 hours at a pressure of about 13.9 bars;

(v) heating said green moulding for about 8 hours at a pressure of about 14 bars; and (vi) cooling said green moulding for about 2 hours.

21. A light weight heat-insulating material of low bulk density comprising calcium hydrosilicate and tobermorite, wherein the light weight heat-insulating material has a total porosity of approximately greater than 90% by volume and a bulk density of less than about 250 kg/m$^3$, said material having a plurality of pores of a size within a range of about 50–300 μm.

22. The heat-insulating material according to claim 21 wherein said pores comprise greater than about 90% by volume of said heat-insulating material.

23. The heat-insulating material according to either claim 21 or 22, wherein the bulk density of said heat-insulating material is less than about 180 kg/m$^3$.

24. The heat-insulating material according to claim 21, wherein said heat-insulating material consists essentially of tobermorite.

25. A light weight heat-insulating material as in claim 21 further including a minimum web thickness between said pores substantially in the range of from about 2 to about 5 μm.

* * * * *